March 27, 1962  A. L. TARDIF  3,027,181
COLLAR TYPE LOCK DEVICE FOR STRUCTURAL MEMBERS OF STAGING
Filed July 8, 1960
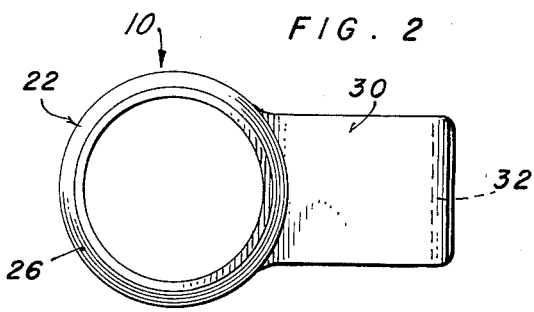
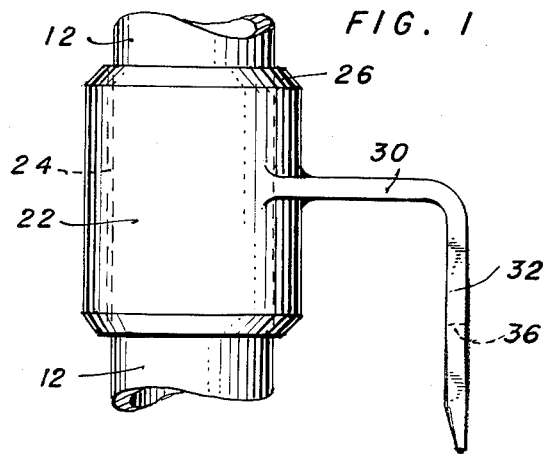
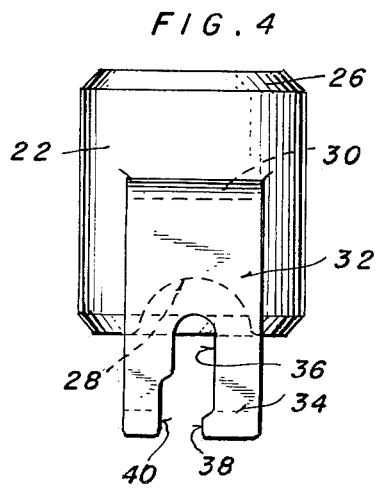
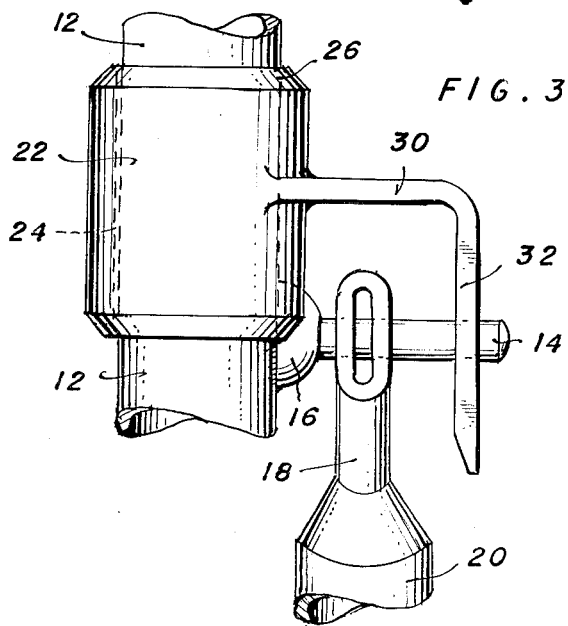
INVENTOR
ARCHIE L. TARDIF

United States Patent Office 3,027,181
Patented Mar. 27, 1962

3,027,181
COLLAR TYPE LOCK DEVICE FOR STRUCTURAL MEMBERS OF STAGING
Archie L. Tardif, 90 Winter St., Laconia, N.H.
Filed July 8, 1960, Ser. No. 41,535
2 Claims. (Cl. 287—53.5)

The present invention is generally related to a collar-type locking device for use on structural members of steel staging and more particularly to a floating type of locking device that is employed for locking structural members of staging together.

The primary object of the present invention is to provide a locking device in the form of a floating collar for locking structural members of staging together that is extremely simple in construction, easy to use, quick and time-saving in assembly and relatively inexpensive to manufacture while yet being dependable and secure as far as its function as a locking device is concerned.

Another object of the present invention is to provide a locking device in accordance with the preceding object that is constructed from a foundry type of casting which does not require any machining operation nor any additional parts secured thereto for rendering the device extremely inexpensive to manufacture.

Another important object of the present invention is to provide a collar-type locking device in accordance with the preceding objects that is substantially self-cleaning in that it will shed mortar or other adhesive building materials and also remove any such material found on the tubular staging upon which the locking device is mounted.

Yet another important object of the present invention is to provide a locking device of the collar type which freely slides on tubular structural members of staging for quickly and easily securing structural members together and retaining them in assembled position in a secure and dependable manner, but yet is readily separable for facilitating the separation of the structural members and also readily moved to a locked position to facilitate the assembly of the structural members.

The foregoing and other objectives, advantages, and features of construction will become apparent from a consideration of the following description and the appended drawings.

FIGURE 1 is a side elevational view of the locking device mounted on a structural member of a steel staging;

FIGURE 2 is a plan view of the construction of FIGURE 1.

FIGURE 3 is a side elevational view similar to FIGURE 1 but with the locking device illustrated in use; and FIGURE 4 is an end elevational view of the locking device illustrating the construction of the locking slot and the notch therein which receives the base of the lock pin.

Referring now specifically to the drawings, the numeral 10 generally designates the locking device of the present invention which is mounted on a tubular structural member 12 for longitudinal sliding movement thereon towards and away from a lock pin 14 extending radially therefrom and rigidly secured thereto as by a base 16 that is secured to the tubular structural member 12 as by welding or the like. The lock pin 14 is rigid with the tubular member 12 and extends radially therefrom for extending through the end portion 18 of another structural member 20 which cooperates with structural member 12 and other similar structural members to form steel staging. The reduced end of the tubular structural member 20 may be flattened or otherwise formed to be completely received on the pin 14 and is provided with a suitable aperture for receiving the pin 14.

The locking device pin includes a tubular or cylindrical collar 22 which has an internal diameter slightly greater than the external diameter of the tubular member 12. The internal diameter is designated by numeral 24 and it has been found that a tolerance of one-thirty-second ($\frac{1}{32}$) of an inch is sufficient for affording longitudinal sliding movement of the collar 22 on the tubular structural member 12. In other words, the internal diameter 24 of the collar 22 is $\frac{1}{32}$ of an inch greater than the external diameter of the tubular structural member 12.

The upper and lower end edge of the collar 22 is chamfered or beveled as indicated by numeral 26 which serves to prevent entry of water from the space between the tubular member 12 and the collar 22. Also, the chamfered or beveled end edges 26 will serve to scrape off or remove any mortar or other building adhesive materials that may be disposed on the exterior surface of the tubular member 12 thereby assuring freedom of movement of the collar 22.

The bottom edge of the collar 22 is provided with a U-shaped notch 28 therein of generally semi-circular configuration which is adapted to receive and engage in the base portion 16 of the lock pin 14. This enables the bottom edge of the locking column 22 to generally become aligned with the center of the lock pin 14.

Projecting radially outwardly from the center of the collar 22 and on the same side as the notch 28 is a flat arm 30 which terminates in a deep ending lock arm 32 divided into a pair of legs or bifurcations 34 by an inwardly extending slot or notch 36 which has an offset projection 38 on one edge thereof adjacent the outer end and an offset recess 40 in the opposite edge so that the slot or notch 36 may be engaged onto and over the pin 14 and will serve somewhat as a lock for preventing disengagement of the lock arm 32 from the pin 14 without rotational movement of the collar 22. Slight rotational movement is necessary when the collar is being locked to the pin and when it is being unlocked from the pin.

I claim the following:

1. A locking device for structural members of staging comprising a cylindrical collar slidably mounted on one structural member, each end of said collar having a chamfer thereon for preventing entry of mortar or other adhesive building materials between said collar and said structural member, and for removing any mortar or adhesive building material disposed on the structural member, a laterally extending arm rigid with the collar, a longitudinally extending arm rigid with the outer end of the laterally extending arm and disposed in parallel relation to the longitudinal axis of the collar, said longitudinally extending arm having a notch in the free end thereof for receiving a lock pin extending rigidly and radially from the structural member on which the collar is mounted, thereby retaining another structural member on the pin for locking the two structural members together.

2. A locking device for structural members of staging comprising a cylindrical collar slidably mounted on one structural member, a laterally extending arm rigid with the outer end of the laterally extending arm and disposed in parallel relation to the longitudinal axis of the collar, said longitudinally extending arm having a notch in the free end thereof for receiving a lock pin extending rigidly and radially from the structural member on which the collar is mounted, said collar being provided with a notch in the lower edge thereof in alignment with the longitudinally extending arm for receiving the base of the locking pin, thereby retaining another structural member on the pin for locking the two structural members together.

References Cited in the file of this patent
UNITED STATES PATENTS
2,823,959   Pimm _____ Feb. 18, 1958
2,935,346   Marr _____ May 3, 1960